United States Patent Office 3,453,340
Patented July 1, 1969

3,453,340
MANUFACTURE OF CHLORINATED
HYDROCARBONS
Joseph Horsefield Brown, Widnes, England, assignor to Imperial Chemical Industries Limited, Millbank, London, England, a corporation of Great Britain
No Drawing. Filed Oct. 18, 1965, Ser. No. 497,515
Claims priority, application Great Britain, Oct. 27, 1964, 43,823/64
Int. Cl. C07c 21/10, 17/10
U.S. Cl. 260—654                    12 Claims

ABSTRACT OF THE DISCLOSURE

Process for the manufacture of trichloroethylene by reacting hydrogen chloride and elemental oxygen with acetylene in the vapor phase using a Deacon catalyst. The reaction temperature is in the range 100° C. to 350° C. and the acetylene is advantageously used in admixture with ethylene. An inert gaseous diluent may also be employed.

---

This invention relates to a process for the manufacture of trichloroethylene.

We have now surprisingly found that trichloroethylene may be obtained from acetylene in a single stage in a convenient manner without loss of chlorine values.

It is an object of the present invention to provide a process for the manufacture of trichloroethylene which comprises bringing into reaction hydrogen chloride and a source of elemental oxygen with a source of acetylene in the vapour phase in the presence of a Deacon catalyst.

Deacon catalysts are well known as catalysts useful in the oxidation of hydrogen chloride to chlorine and comprise the compounds of metals of variable valency such as, for example, copper chloride supported on a solid such as, for example, activated alumina. Such a catalyst may contain an alkali metal chloride such as potassium chloride. Compounds of elements of variable valency other than those of copper may be present in the catalysts.

When a source of relatively pure acetylene is available this may, if desired, be diluted as a positive step with an inert gas such as nitrogen. Again if such a source of pure acetylene is utilised this may be diluted with a recycle gas which is a gaseous reaction product comprising trichloroethylene. Alternatively sources of acetylene are available which can be used in the present process and which owing to their method of manufacture are already diluted with gases such as hydrogen, nitrogen and carbon monoxide. When using such a feed stock in the process of the present invention the hydrogen component is, substantially unchanged in passing through the reactor.

Sources of acetylene in association with various proportions of ethylene are available commercially and can be used in the present process. These sources can be obtained by cracking normally, vaporous or liquid hydrocarbons under a variety of conditions at high temperatures. Such sources of acetylene and ethylene are usually associated with other gases comprising hydrogen, carbon oxides, methane, nitrogen and possibly smaller amounts of higher hydrocarbon. When using such a mixed acetylene-ethylene feed stock in the process of the present invention the ethylene component is surprisingly, substantially unchanged on passing through the reactor.

It is a further object of the present invention therefore to provide a process for the manufacture of trichloroethylene which comprises bringing into reaction hydrogen chloride and a source of elemental oxygen with a source of acetylene also containing ethylene in the vapour phase in the presence of a Deacon catalyst.

The present process may be carried out with a static bed of catalyst but preferably a fluidised bed is employed. Normal or superatmospheric pressures may be employed.

The source of elemental oxygen may suitably be oxygen itself, air, or a gas containing an enhanced proportion of oxygen.

In association with the main product trichloroethylene, there are produced as by-products in the process dichloroethylenes, mainly trans-dichloroethylenes.

Suitably the molar ratio of acetylene to oxygen is in the range 1.3:1 to 1.7:1. Lower or higher molar ratios than there can be employed although there should be taken into account that with lower ratios the reaction is not so clean in that 1:2-dichloroethane, 1:2:2-trichloroethane and higher chloroethanes are found in the reaction product while with higher ratios of acetylene/oxygen a reduced acetylene conversion is obtained. Preferably the molar ratio of acetylene/oxygen is in the range 16.3:1 to 1.4:1 and particularly useful results are obtained when using a molar ratio of acetylene/oxygen of approximately 1.35:1. Thus when using the latter molar ratio $C_2H_2$ conversions of approximately 95% can be obtained with formation of approximately equimolar amounts of trichloroethylene and dichloroethylenes, mainly trans-dichloroethylene. When using molar ratios of acetylene to oxygen of approximately 1.45:1 to 1.67:1 conversion on $C_2H_2$ of approximately 80%, in any case not usually not more than 90%, are obtained. The mechanism whereby the reaction ensues is involved and is not fully understood but it is a fact that good yields of trichloroethylene may be obtained from acetylene according to the process of the invention. However it is suggested that under optimum conditions the reaction of the present process may be approximately represented as follows:

$$C_2H_2 + \tfrac{3}{4} O_2 + 2\tfrac{1}{2} HCl = \tfrac{1}{2} C_2HCl_3 + \tfrac{1}{2} C_2H_2Cl_2 + 1\tfrac{1}{2} H_2O$$

This corresponds to a molar feed ratio of the reactants, that is, $HCl/C_2H_2/O_2$ of 2.5:1:0.75. This contrasts sharply with the reaction involving oxychlorination of ethylene wherein the corresponding ratio of $HCl/C_2H_4/O_2$ is 2:1:0.5.

Suitably the oxychlorination of acetylene to give trichloroethylene (and dichloroethylenes as by-products) is carried out at a temperature in the range 100° C. to 350° C., preferably 200° C. to 275° C.

The present invention also envisages within its scope the combined process wherein following the catalytic process and, after recovery of the trichloroethylene, any unchanged ethylene from a feed gas containing the same is utilised in a second reaction zone by means of a suitable reagent to convert the ethylene into useful products. For example, unchanged ethylene may be chlorinated or oxychlorinated to 1:2-dichloroethane. This can be pyrolysed to give vinyl chloride and hydrogen chloride, the latter being utilised in the oxychlorination of the acetylene or ethylene.

The dichloroethylenes, mainly trans-dichloroethylene, which are formed in the reaction may be further utilised by chlorination or oxychlorination to give trichloroethylene and/or tetrachloroethanes which can be cracked to give more trichloroethylene. Hydrogen chloride evolved by such chlorination reactions can in turn be utilised in the oxychlorination of the acetylene or ethylene. Alternatively, if the demand requires it, the dichloroethylenes, may be hydrochlorinated to give 1,2,2-trichloroethane which is an intermediate for 1,1-dichloroethylene and 1,1,1-trichloroethane.

The following examples illustrate but do not limit the invention.

EXAMPLE 1

The reactor consisted of a vertical, heat-resistant glass tube 20 cm. long and of 2.5 cm. external diameter. Various amounts of a Deacon catalyst supported on an activated alumina known as "Actal" A (registered trademark) were placed in the tube. One run was carried out in which the Deacon catalyst containing 5% by weight Cu contained no alkali metal chloride while in other runs this copper containing catalyst was associated with either NaCl or KCl. The particle size of the catalyst was 5–8 mesh (British Standard Specification). The gas feed was premixed and passed through the static bed of the catalyst. The reaction conditions and results obtained are indicated in Table 1.

TABLE 1

| Ratio by weight of copper chloride to alkali chloride | Addition of alkali chloride to Cu catalyst | | | |
|---|---|---|---|---|
| | None | NaCl | KCl | KCl |
| | | 1:2 | 2:1 | 2:1 |
| Catalyst charge, ml | 100 | 100 | 60 | 60 |
| Feed rate, l./hr | 58 | 56 | 59.5 | 58.5 |
| Composition of feed, percent v./v.: | | | | |
| $N_2$ | 16.9 | 76.3 | 77.9 | 77.75 |
| HCl | 14.0 | 14.3 | 13.4 | 13.62 |
| $O_2$ | 3.85 | 3.95 | 3.7 | 3.42 |
| $C_2H_2$ | 5.25 | 5.35 | 5.0 | 5.22 |
| Mole ratio $C_2H_2/O_2$ in feed | 1.36 | 1.35 | 1.35 | 1.53 |
| Temperature inlet, ° C | 210 | 210 | 200 | 197 |
| Temperature hot spot, ° C | 270 | 300 | 293 | 284 |
| $C_2H_2$ conversions, percent | 71.9 | 94.7 | 95.2 | 90.1 |
| $O_2$ conversions, percent | 76.5 | 98.9 | 98.1 | 97.8 |
| HCl conversions, percent | 57.5 | 84.8 | 84.4 | 78.3 |
| Retention time, sec | 3.4 | 3.5 | 2 | 2 |
| Space time yield, g./h./l. catalyst | 90 | 125 | 218 | 203 |
| Burning rate, percent $C_2H_2$ | 4.8 | 3.8 | 4.0 | 4.2 |
| Co-products made per one mol. tri.: | | | | |
| $CH_2=CCl_2$ mol | 0.300 | 0.232 | 0.093 | 0.124 |
| Trans CHCl=CHCl mol | 1.007 | 0.410 | 0.685 | 0.535 |
| Cis CHCl=CHCl mol | 0.868 | 0.515 | 0.181 | 0.185 |
| Total $C_2H_2Cl_2$ mol | 2.175 | 1.157 | 0.959 | 0.844 |
| $C_2Cl_4$ mol | 0.006 | 0.035 | 0.030 | 0.036 |
| Total mol | 2.181 | 1.192 | 0.989 | 0.880 |

The results set out in Table 1 clearly show there is a much improved conversion of $C_2H_2$, of $O_2$ and of HCl and improved space time yields when alkali metal chlorides were present in the catalyst. The space time yield when utilising the Deacon catalyst containing NaCl and when employing a retention time of 3.5 sec. was 125. The space time yield when utilising the catalyst containing KCl and when employing an even shorter retention time of 2 sec. was well over 200. A conversion of $C_2H_2$ of 95% was obtained with the molar ratio of $C_2H_2:O_2$ of 1.35 while a molar ratio of $C_2H_2:O_2$ of 1.53:1 gave a conversion of $C_2H_2$ of 90%.

EXAMPLE 2

Runs were carried out using the apparatus of Example 1 when employing a static bed of catalyst. The catalyst employed (75 g.) was the one containing copper chloride/potassium chloride supported on the activated alumina. In one run hydrogen was present in the feed gas containing acetylene while in the other run ethylene was present in the feed gas containing acetylene. The reaction conditions and the results obtained are indicated in Table 2.

TABLE 2

| | | |
|---|---|---|
| Catalyst charge, ml | 60 | 60 |
| Feed rate, l./hr | 59.5 | 59.5 |
| Composition of feed, percent v./v.: | | |
| $H_2$ | 63.1 | |
| $C_2H_4$ | | 5.0 |
| $N_2$ | 14.8 | 72.9 |
| HCl | 13.4 | 13.4 |
| $C_2H_2$ | 5.0 | 5.0 |
| $O_2$ | 3.7 | 3.7 |
| Temperature inlet, ° C | 190 | 170 |
| Hot spot | 270 | 265 |
| Mole ratio in feed, $C_2H_2/O_2$ | 1.35 | 1.35 |
| $C_2H_2$ conversion, percent | 89.4 | 97.1 |
| $O_2$ conversion, percent | >90 | 98.3 |
| HCl conversion, percent | 80.3 | 88.8 |
| Burning rate of $C_2H_2$, percent | 2.0 | 1.4 |
| Space/time yield, g./h./l. catalyst | 209 | 228 |
| Composition of organic condensate in mol percent: | | |
| $CH_2=CCl_2$ | 4.5 | 4.45 |
| Trans CHCl=CHCl | 41.25 | 36.9 |
| Cis CHCl=CHCl | 7.44 | 8.75 |
| $C_2HCl_3$ | 45.3 | 49.0 |
| $C_2Cl_4$ | 1.5 | 1.1 |

It was found that $H_2$ and $C_2H_4$ passed through the reactor virtually unchanged.

EXAMPLE 3

The reactor consisted of a vertical, heat-resistant glass tube 60 cm. long and of 2.1 cm. internal diameter and was equipped with a central thermocouple pocket 0.81 cm. in diameter. A spiral of 0.32 cm. nickel wire was fixed tightly by tension to the internal reactor walls and a similar spiral was wound tightly round the thermocouple pocket. The pitch of both spirals was 7.5 cm. The spirals served to prevent slugging of the bed. (This type of fluidised bed reactor is described in our copending British application No. 41,359/65.)

Into the annulus between the glass tube and the thermocouple pocket were placed 75 g. of a Deacon catalyst consisting of cupric chloride and potassium chloride supported on microspheroidal alumina. The catalyst contained 5% by weight copper and 2.8% by weight potassium. The gaseous feed (the diluent being nitrogen) was fed to the reactor and maintained the catalyst in the fluidised state.

The feed gas consisted of 4.4% v./v. oxygen, 5.9% v./v. acetylene, 15% v./v. hydrogen chloride and 75% v.v. nitrogen. The mole ratio of $C_2H_2:O_2$ was 1.34:1. The total feed rate was 121.2 l/hr. and the reaction temperature was 200° C. Conversions on $C_2H_2$ and $O_2$ were 93.2% and 89%, respectively. The burning rate was less than 0.8% and the space time yield was 326 g./h./l. of expanded bed. The composition of the product (mole %) was $CH_2=CCl_2$ 1.7, trans CHCl=CHCl 40.7, cis CHCl=CHCl 2.9, $C_2HCl_3$ 49.1, $C_2Cl_4$ 4.6.

What I claim is:
1. A process for the manufacture of trichloroethylene which comprises reacting hydrogen chloride and elemental oxygen with acetylene in the vapor phase in the presence of a Deacon catalyst and at a temperature in the range of 100° C. to 350° C., wherein the ratio of oxygen/acetylene/HCl is 1:1.3–1.7:3.25–4.4.
2. A process as claimed in claim 1 in which the acetylene is used in admixture with 5% by volume of ethylene.
3. A process as claimed in claim 1 in which the reaction temperature is in the range 200° C. to 275° C.
4. A process as claimed in claim 1 in which the reaction is carried out in the presence of an inert gaseous diluent.
5. A process as claimed in claim 1 in which a fluidised bed of catalyst is employed.
6. A process as claimed in claim 1 in which a static bed of catalyst is employed.
7. A process as claimed in claim 1 in which the molar ratio of acetylene to oxygen in the range 1.3:1 to 1.4:1 is employed.

8. A process as claimed in claim 7 in which the molar ratio of acetylene/oxygen of approximately 1.35:1 is employed.

9. A process for the manufacture of trichloroethylene which comprises reacting hydrogen chloride and elemental oxygen with acetylene in the vapour phase in the presence of a Deacon catalyst and at a temperature in the range 100° C. to 350° C., and wherein the ratio of hydrogen chloride, acetylene and oxygen is 2.5:1:0.75.

10. A process according to claim 9 wherein the catalyst contains copper.

11. A process according to claim 10 wherein the catalyst is copper chloride supported on alumina.

12. A process for the manufacture of trichloroethylene which comprises reacting hydrogen chloride and elemental oxygen with acetylene in the vapor phase in the presence of a Deacon catalyst and at a temperature in the range of 100° C. to 350° C., wherein the ratio of oxygen/acetylene/HCl is 1:1.3–1.7:3.3–4.2.

References Cited

UNITED STATES PATENTS

| 2,374,923 | 5/1945 | Cass | 260—659 |
| 2,858,347 | 10/1958 | Hutchings | 260—659 X |

BERNARD HELFIN, *Primary Examiner.*

J. BOSKA, *Assistant Examiner.*